United States Patent
Roed et al.

(10) Patent No.: US 11,898,542 B2
(45) Date of Patent: Feb. 13, 2024

(54) WIND TURBINE AND METHOD OF CONTROLLING A BLADE ANTI-ICE SYSTEM

(71) Applicant: VESTAS WIND SYSTEMS A/S, Aarhus N (DK)

(72) Inventors: Carsten Roed, Bjerringbro (DK); Jan Slej, Ringkøbing (DK)

(73) Assignee: Vestas Wind Systems A/S, Aarhus N (DK)

( * ) Notice: Subject to any disclaimer, the term of this patent is extended or adjusted under 35 U.S.C. 154(b) by 304 days.

(21) Appl. No.: 17/417,046

(22) PCT Filed: Dec. 17, 2019

(86) PCT No.: PCT/DK2019/050397
§ 371 (c)(1),
(2) Date: Jun. 21, 2021

(87) PCT Pub. No.: WO2020/125894
PCT Pub. Date: Jun. 25, 2020

(65) Prior Publication Data
US 2022/0049683 A1   Feb. 17, 2022

(30) Foreign Application Priority Data

Dec. 20, 2018   (DK) .......................... PA 2018 70836

(51) Int. Cl.
*F03D 80/40* (2016.01)
*F03D 1/06* (2006.01)

(52) U.S. Cl.
CPC ........... *F03D 80/40* (2016.05); *F03D 80/401* (2023.08); *F03D 1/0675* (2013.01); *Y02E 10/72* (2013.01)

(58) Field of Classification Search
CPC ......... F03D 80/40; B64D 15/12; B64D 15/14; Y02E 10/72
See application file for complete search history.

(56) References Cited

U.S. PATENT DOCUMENTS 8,784,059 B2 * 7/2014 Zalusky .................. F03D 17/00
                                                  416/146 R
9,828,972 B2 * 11/2017 Cuoghi ................... F03D 7/042
(Continued)

FOREIGN PATENT DOCUMENTS

CA      2910675 A1 *   4/2016
CA      2948017 A1     5/2018
(Continued)

OTHER PUBLICATIONS

English translation of CN101109523A (Year: 2008).*
(Continued)

*Primary Examiner* — Topaz L. Elliott
*Assistant Examiner* — Wesley Le Fisher
(74) *Attorney, Agent, or Firm* — Patterson + Sheridan, LLP (57) ABSTRACT

A wind turbine comprising a plurality of wind turbine blades, a blade anti-ice system including a blade heating arrangement associated, wherein the anti-ice system includes a control system and a power supply configured to provide power to the blade heating arrangement, characterised in that the power supply comprises a power converter. A benefit of using a power converter to supply electrical power to the heating devices is that power can be applied in a stepless manner. A much finer degree of control is therefore achieved over the thermal energy applied to the blade since the power can be ramped up gradually as the system controller determines that the icing conditions are becoming more severe. As a result of the use of the power converter, (Continued)

the magnitude of thermal energy that is applied to the blade can be increased gradually and smoothly.

20 Claims, 5 Drawing Sheets

(56) References Cited

U.S. PATENT DOCUMENTS

| | | | |
|---|---|---|---|
| 10,063,047 B2* | 8/2018 | Duarte | H05B 1/0236 |
| 10,823,152 B2* | 11/2020 | Roeper | F03D 80/40 |
| 10,927,821 B2* | 2/2021 | Badger | F03D 80/40 |
| 11,703,035 B2* | 7/2023 | Arlaban Gabeiras | F03D 7/0224 |
| | | | 416/1 |
| 2010/0206990 A1 | 8/2010 | Petrenko | |
| 2010/0224621 A1* | 9/2010 | Mortensen | B64D 15/20 |
| | | | 219/490 |
| 2013/0022466 A1* | 1/2013 | Laurberg | F03D 80/40 |
| | | | 219/539 |
| 2015/0023792 A1 | 1/2015 | Spitzner et al. | |
| 2016/0084231 A1 | 3/2016 | Runge et al. | |
| 2019/0003463 A1* | 1/2019 | Buggy | F03D 80/40 |

FOREIGN PATENT DOCUMENTS

| | | | | |
|---|---|---|---|---|
| CN | 101109523 A | * | 1/2008 | |
| CN | 106247441 A | * | 12/2016 | |
| CN | 107939620 A | | 4/2018 | |
| CN | 207795485 U | | 8/2018 | |
| CN | 108869203 A | | 11/2018 | |
| DE | 202015003529 U1 | * | 7/2015 | ............ F03D 80/40 |
| WO | WO-2017108064 A1 | * | 6/2017 | |
| WO | WO-2017167346 A1 | * | 10/2017 | |
| WO | 2020125894 A1 | | 6/2020 | |

OTHER PUBLICATIONS

English translation of CN106247441A (Year: 2016).*
English translation of DE202015003529U1 (Year: 2015).*
Danish Patent and Trademark Office Search Report for Application No. PA 2018 70836 dated Jun. 21, 2019.
Patent Cooperation Treaty (PCT) International Search Report for Application No. PCT/DK2019/050397 dated Mar. 13, 2020.
PCT Written Opinion of the International Searching Authority for Application No. PCT/DK2019/050397 dated Mar. 13, 2020.

* cited by examiner

WIND TURBINE AND METHOD OF CONTROLLING A BLADE ANTI-ICE SYSTEM

TECHNICAL FIELD

The invention relates to an anti-icing system for a wind turbine which is configured to provide improved control over that system. The invention also extends to and therefore embraces a wind turbine and wind turbine blade including such an anti-ice system.

BACKGROUND

Wind turbines generate electrical power from wind energy and can be situated on land or off-shore. Wind turbines may be installed in cold climates with sub-zero temperatures. As such, wind turbines can suffer from ice-accumulation (or "icing") on the wind turbine blades, where ice forms on the surface of the blades. A known issue is that blade icing can change the aerofoil profile of the blades which makes them aerodynamically less efficient. As a result, the wind turbine may operate below optimal speed at a given wind speed which degrades its performance. The additional weight of the accumulated ice may also cause accelerated fatigue issues, and the ice may detach from the blade which can cause damage to nearby equipment.

Various systems and methods have been described to either remove ice from the blades (referred to as "de-icing"), or to prevent ice accumulating on the blades (referred to as "anti-icing"). There are various de-icing techniques known in the art. For example, hot-air de-icing systems blow heated air into the large cavities of the blade to increase the surface temperature of the blade thereby melting any ice that has formed. However, this technique is not energy efficient as it requires the wind turbine to be shut down so that the blades are stationary. This prevents the wind turbine from generating power during the time it takes to de-ice the blades. Furthermore, blowing hot-air into the large cavities consumes a high amount of electrical power.

It is known that a more energy efficient technique for de-icing blades is to incorporate an array of electro-thermal heating elements below the surface of the blades. When supplied with electrical power, the heating elements generate thermal energy that increases the surface temperature of the blades thereby preventing ice formation.

In known systems, electro-thermal heating elements are electrically controlled by a control unit using a relay-based control system, where the relays are typically either electro-mechanical (EMR) or solid-state relays (SSR). The environment in which such relay-based power solutions are installed can compromise the reliability of those systems. For example, blade interiors can experience high levels of humidity and also electrostatic fields, both of which can affect the proper functioning of electrical and mechanical relays.

The present invention seeks to address, at least in part, the problems and disadvantages described above by providing an improved system for controlling the heating of wind turbine blades.

SUMMARY OF THE INVENTION

According to a first aspect of the invention, there is provided a wind turbine comprising a plurality of wind turbine blades, a blade anti-ice system including a blade heating arrangement, a control system and a power supply configured to provide power to the blade heating arrangement. The power supply comprises a power converter and the control system controls the power output of the power converter so as to apply a stepless power input to the blade heating arrangement.

The invention extends to and also embraces a method of controlling a wind turbine blade anti-ice system, the anti-ice system including a blade heating arrangement, a control system and a power supply configured to provide power to the blade heating arrangement, wherein the power supply includes a power converter and wherein the method comprises: controlling the power output of the power converter so as to apply a stepless power input to the blade heating arrangement.

A benefit of using power converter to supply electrical power to the heating devices is that power can be applied in a stepless manner. A much finer degree of control is therefore achieved over the thermal energy applied to the blade since the power can be ramped up gradually as the system controller determines that the icing conditions are becoming more severe. As a result of the use of the power converter, the magnitude of thermal energy that is applied to the blade can be increased gradually and smoothly. Advantageously this means that gradual changes can be made to the applied current in response to changing environmental conditions. For example, if it is detected by the control system that the environmental temperature is falling, and the air water content is above a predetermined threshold, such that the risk of ice accretion is increasing, then the thermal energy applied to the blade may be increased slightly. Therefore, only the minimum amount of energy is used to prevent ice formation.

The control system may control the power output of the power converter by monitoring one or more climatic conditions, determining the minimum thermal energy output required to prevent icing from forming on the blade, and applying power to the blade heating arrangement to track the determined minimum thermal energy output. Moreover, the control may be based on a determined difference between a measured temperature of a wind turbine blade surface and a measured temperature of the blade heating arrangement.

In this example, therefore, the thermal energy applied to the blade tracks a predetermined parameter so that the temperature of the electrical heating devices are caused to have a predetermined temperature differential when compared to the temperature at the blade surface. Maintaining a predetermined temperature differential is an efficient way to manage the power demand of the anti-ice system.

Since the power converter provides fine control of over the application of electrical current to the blade heating function, the system can be considered to provide a stepless power input to the blade heating arrangement. Such an arrangement may include electric heating devices, which may be based on a conductive wire grid or net embedded in or on the blade surface.

A single power converter may be provided to control the blade heating arrangements on all of the blades. Thermal energy may therefore be applied to the blades equally. However, in other embodiments it may be appropriate to provide a power converter for each blade.

It should be noted that the invention extends to and embraces an anti-ice system for a wind turbine comprising a blade heating arrangement, a control system and a power supply configured to provide power to the blade heating arrangement, characterised in that the power supply comprises a power converter.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

In the drawings, like features are denoted by like reference signs.

SPECIFIC DESCRIPTION

A specific embodiment of the invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
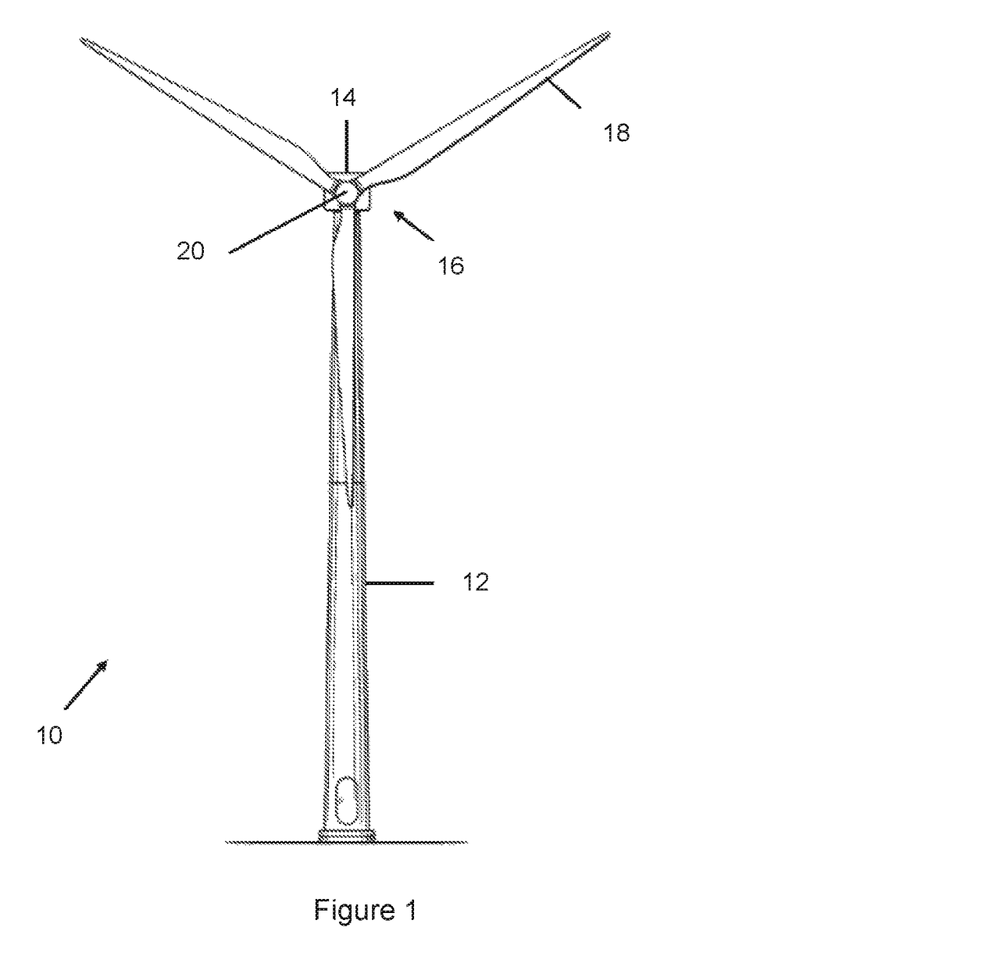
FIG. 1 illustrates a front view of a horizontal-axis wind turbine in which embodiments of the invention may be incorporated.
Figure 2:
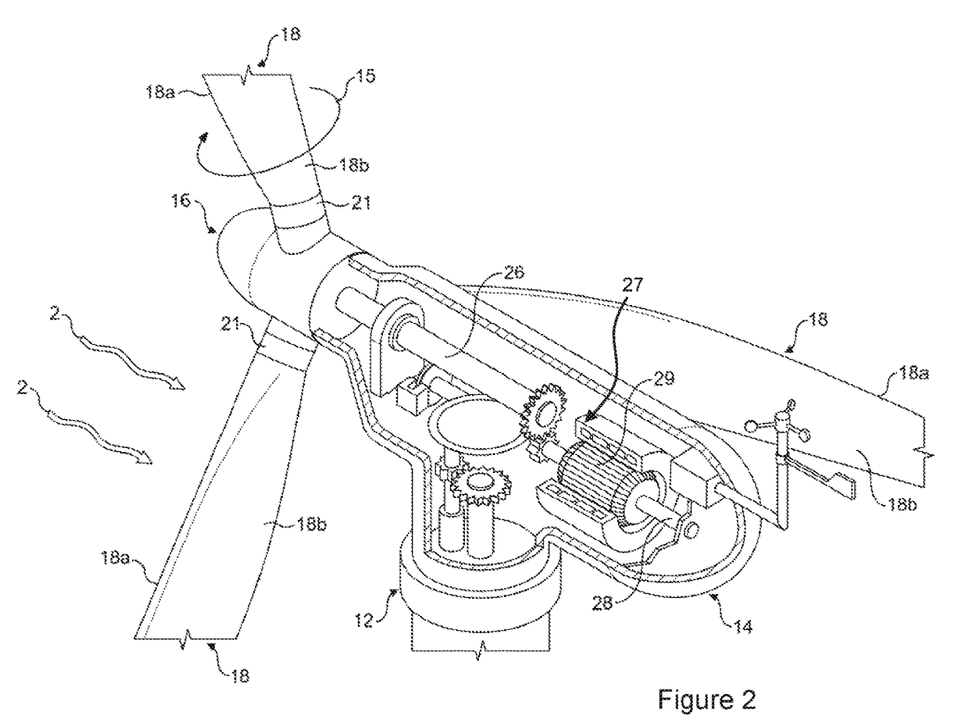
FIG. 2 illustrates a perspective cut-away view of typical components internal to the nacelle and tower of the wind turbine of FIG. 1.

With reference to FIGS. 1 and 2 a wind turbine, generally designated as 10, comprises a tower 12 that is fixed to the ground and which supports a nacelle 14, located at the top of the tower 12. A rotor 16 is mounted on the tower 12 and comprises a plurality of rotor blades 18 extending radially from a central hub 20. In this example, the rotor 16 comprises three rotor blades 18, although it will be apparent to those skilled in the art that other configurations are possible. The blades 18 may be connected to the hub 20 using pitch bearings 21 such that each blade 18 may be rotated around its longitudinal axis to adjust the pitch of the blade.

FIG. 2 illustrates a schematic view of typical components internal to the nacelle 14 and tower 12 of the wind turbine 10, shown in FIG. 1. The rotor 16 is connected to a low speed shaft 26. Each blade 18 has a windward blade surface 18a and a leeward blade surface 18b. Each blade 18 may be rotated using the pitch bearing 21 in order to vary the pitch, as indicated by the circular arrow 15.

As would be well understood to the skilled person, incoming wind flow 2 acts on the blade surfaces 18a, 18b to create aerodynamic lift, which causes the rotor 16 to rotate, which also rotates the low-speed shaft 26. A gearbox 27 mechanically converts the low rotational speed of the low-speed shaft 26 into a relatively high rotational speed of a high-speed shaft 28 suitable for generating electricity using a generator 29. The wind turbine 10 may also include a braking system (not shown in the figures) for emergency shut down situations and/or to lock the rotor 16 into a required stationary position.

In addition to the generator, the nacelle 14 houses miscellaneous components required for converting wind energy into electrical energy, along with various other components needed to operate, control, and optimise the performance of the wind turbine 10.

In cold weather conditions it is known that the blades 18 can suffer icing, which can change the aerofoil profile, the angle of attack, and/or the effective pitch of the blades 18. Furthermore, icing can reduce the overall speed of rotation of the blades 18 for a given wind speed due to the changes in aerodynamic characteristics. In order to maintain an ice free surface on the blade surfaces, the wind turbine includes an anti-icing system 30.

Figure 3:
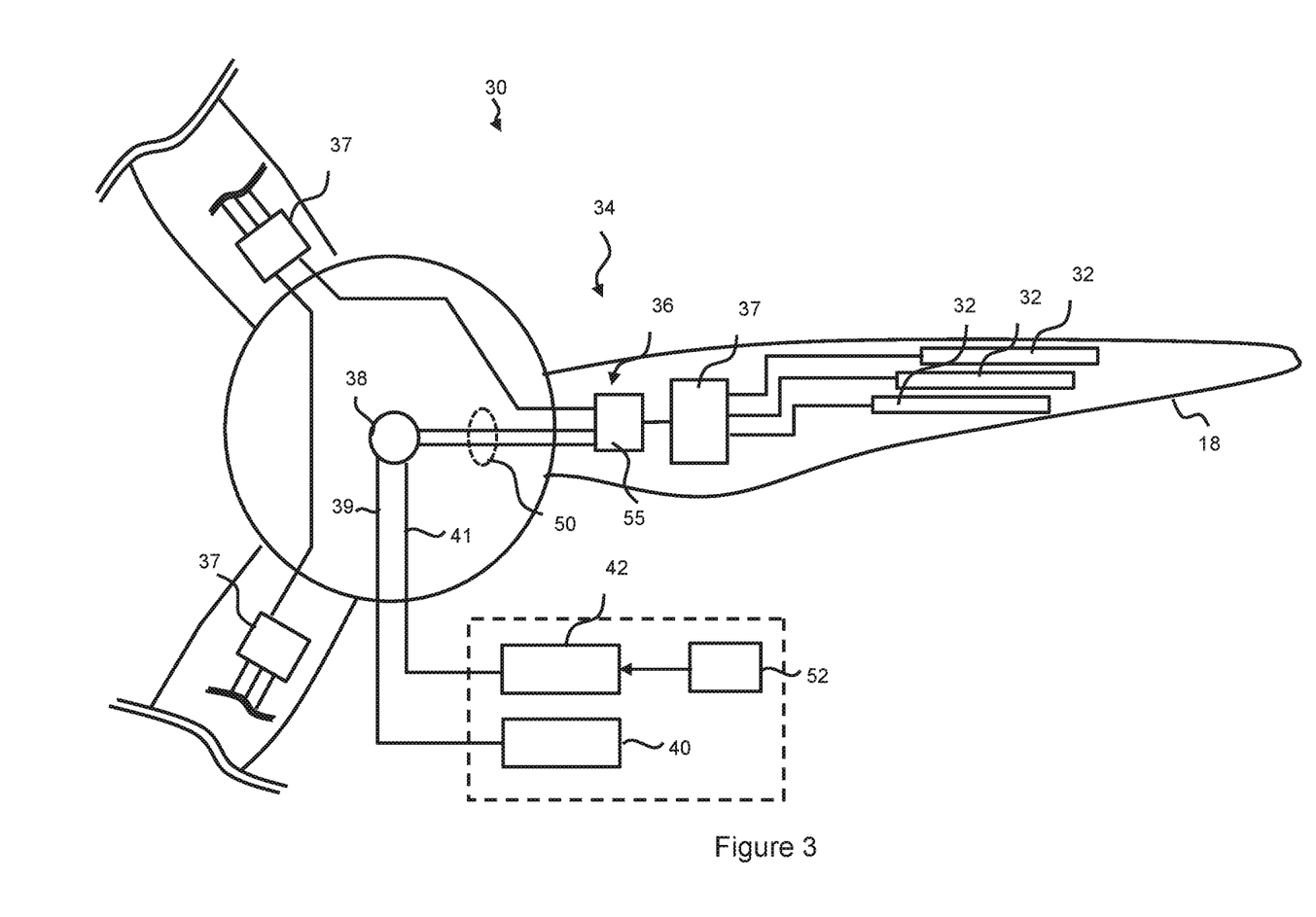
FIG. 3 is a system view of an anti-icing system of the wind turbine according to one or more embodiments of the invention.

FIG. 3 is a system view of the anti-icing system 30 for one or more blades 18 of the wind turbine 10, as shown in FIGS. 1 and 2. The anti-icing system 30 comprises a plurality of electrical heating devices 32 that are electrically connected to a power and control system 34, as will be described in further detail below. In the illustrated embodiment, the heating devices 32 are in the form of electro-thermal heating elements. It should be noted at this point that although the illustrated embodiment includes several heating devices in each blade, there may instead be provided one or more devices in each blade. Collectively, the heating devices may be referred to as a blade heating arrangement.

The anti-ice system 30 provides a means to combat the build-up of ice on the surface of the blade. To this end the anti-ice system may be operable to apply heat to the blade surface under various triggering conditions using the one or more heating devices 32.

The heating devices or elements 32 may be in the form of electrically conductive mats, panels or pads, which are generally known in the art. Alternatively, the electrical heating devices 32 may be embodied in the form of a run of electrically resistive cable that is wound or routed in appropriate regions of the blade surface in order to generate heat at desired locations. A type of suitable electrical heating device is known from WO2017/108064, which discloses heating devices in the form of a glass fibre mat coated with electrically conductive carbon. Although electrically conductive, the devices have associated resistance values. As such when, a voltage is applied across a heating device, the current will follow due to the resistance of the carbon material, in accordance with Ohms Law. This causes Joule heating (also known as Ohmic heating) of the heating devices, which is why they are referred to as "electro-thermal" heating devices/elements. In accordance with Joule's first law shown in equation (1), the power generated by the heating devices is linearly proportional to the product of its resistance/impedance (R) value and the square of an applied current ($I_{applied}$), where the resistance/impedance (R) value of the materials (i.e. the glass fibre and the carbon) are typically known constants.

Another type of heating element is a conductive net, sometimes referred to as a "ring net". In such a device, electrically conductive strands, wires or leads are woven into a net. Such a system has an advantage that the heating of the net will be substantially unaffected by damage occurring to discrete elements of the net.

In the illustrated embodiment, three heating devices 32 are provided in spaced apart locations along the blade. As shown in FIG. 3 the spacing of the heating devices 32 is for convenience only and does not indicate a particular spacing within the blade. Typically more than three heating devices may be provided, although this is not essential, and the heating devices may have an optimised spacing that is different to what is shown here. For example, between ten and forty heating devices may be incorporated in the blade, distributed between windward and leeward surfaces. Certain arrangements of heating devices may be devised in which less critical or vulnerable areas of the blade are not provided with heating devices, for example regions near to the blade root. However, it should be noted at this point that the spacing of the heating devices is not central to the invention and the previous arrangements are only provided by way of example. Accordingly, a single heating device extending over a significant area of the blade would also be an acceptable configuration.

Remaining with the schematic system view of FIG. 3, the power and control system 34 for the heating devices 32 includes, in overview, a power control module 36, a mode selector 37, a power transfer arrangement 38, a power supply or source 40 and a system controller 42. It should be appreciated at this point that the anti-ice system 30 is only shown here for one of the blades and that, in practice, each blade would be provided with an identical or similar arrangement. For the sake of clarity, however, reference will be made in this discussion to a single anti-ice system and it will be understood as encompassing equivalent components and functionality provided in the other blades of the wind turbines. The various electrical and electronic components referred to above are coupled together as appropriate by suitable power and control cables and/or busbars so that power and control signals may be transferred between the respective components as required.

The power transfer arrangement 38 is a rotating interface between the rotating hub and the stationary nacelle. Such a component is conventional and so a full discussion is not required here. However, such a component typically takes the form of a slip ring arrangement which is able to transfer power from a nacelle-based power input and provide a power output into the rotating structure of the hub for supplying power to whichever power consumers are located in the hub. One such power consumer is the hub-based components of the anti-ice system.

The power transfer arrangement 38 may transfer DC and/or AC power. Typically, AC power will be transferred either as a single phase or as three phases.

The power transfer arrangement is 38 also able to transfer electronic signals across the rotating interface. As such the power transfer arrangement 38 is shown here as a first input 39 from the power source 40 and a second input 41 from the system controller 42.

The power transfer arrangement 38 provides an output 50 to the power control module 36. The output 50 provides power but also may provide electronic signals. It should be noted that although electronic signals may be transferred by a hardwired network, it is also possible for those electronic signals to be transferred by way of a wireless network.

The power control module 36 receives the power and control signal output 50 from the power transfer arrangement 38 and provides regulated power to the electrical heating devices 32 in order to control their operation. In the illustrated embodiment, the power control module 36 also provides power to the electrical heating devices 32 that are installed in the other blades. This may be a more efficient arrangement since only a single power control module 36 is required. In some circumstances, however, a power control module 36 may be provided for each blade. In the illustrated embodiment, the power and control module 36 applies power to the electric heating devices 32 though the model selector 37. In embodiments having a plurality of electrical heating devices 32 in the blade, the mode selector 37 enables activation of selected ones of the heating devices. So, the mode selector 37 is an optional item and not essential.

The system controller 42 controls the operation of the anti-ice system 30 and may be embodied in different ways. As shown here, the system controller 42 is based in the nacelle 14. However, this is not essential and the system controller 42 may instead be based in the hub or the tower, for example. The functionality provided by the system controller 42 may, moreover, be provided by a main wind turbine controller (not shown) or the system controller 42 may be a dedicated control unit for controlling the anti-ice system 30 only.

The system controller 42 receives input data regarding the operation of the wind turbine, and its operational environment, and performs processing to determine the desired activation strategy for the electrical heating devices 32. In the illustrated embodiment, the anti-ice system 30 includes a sensor system 52 which measures the ambient weather conditions external of the wind turbine 10 and may also sense or otherwise receive operational data from the wind turbine. The sensor system 52 may include a temperature sensor for measuring the outside air temperature, a humidity sensor for measuring the outside humidity, a wind speed sensor for measuring the external wind speeds, and an atmospheric pressure sensor for measuring the atmospheric pressure. The sensor system 52 may also include a sensor that is able to determine a power generation value of the generator 29. It should be noted at this point that the sensor system 52 has been identified as a separate module that may include appropriate sensors to provide the required data. However, the sensor system 52 may represent a data stream from another system of the wind turbine, which may be the main turbine control computer, for example.

The measured outside air temperature, humidity, wind speed, atmospheric pressure, and power output generation values are collectively referred to as "sensor data". Parameters included in the sensor data may be modelled in addition to or instead of being measured directly. Principally, however, the system controller 42 is configured to acquire or determine a current environmental profile in order to measure and predict the actual and expected ice accumulation on the blades. Based on this profile, the system controller 42 is able to determine to activate, deactivate, or regulate at least one of the heating devices 32 by providing appropriate control inputs to the power control module 36, as will be described in more detail below.

The power control module 36 is able to provide precise control over the power that is distributed to the electrical heating devices. To this end, the power control module 36 comprises an electronic power converter 55. Power converters are known in the art for converting electrical energy from one form to another, such as converting alternating current (AC) to direct current (DC) or visa-versa, or for converting AC power at a first voltage level and frequency, to a different voltage and/or frequency. Power converters are therefore able to vary an output voltage, output current, and frequency, independently, of a power supply input. Notably, the power converter is operable to control the power output, and therefore also the thermal output energy of the heating devices, is a smooth stepless manner.

The power converter 55 may take various forms. In the illustrated embodiment, the power converter is a three-phase back-to-back power or 'frequency' converter. The skilled person would appreciate that a suitable converter would be available from various vendors, such as ABB, Danfoss or Schneider Electric. A suitable converter may have a 80 kw continuous operation rating, with a maximum current and voltage limit safety function.

In the illustrated embodiment, the power converter 55 is electrically connected to each heating device 32 through the mode selector 37. The mode selector 37 is configured to selectively switch power provision to one or more of the heating devices 32 in the blade 18. Therefore, where the heating devices 32 are configured to cover different zones of the blade, the mode selector 37 may be used to target the thermal energy applied to the specific areas of the blade in dependence on what zones are most at risk from icing.

A benefit of using the power converter 55 to supply electrical power to the heating devices 32 is that power can be applied in a stepless manner. A much finer degree of control is therefore achieved over the thermal energy applied to the blade since the power can be ramped up gradually as the system controller 42 determines that the icing conditions are becoming more severe. As a result of the use of the power converter 55, the magnitude of thermal energy that is applied to the blade can be increased gradually and smoothly. This has at least two principle benefits. Firstly, the control afforded over the application of thermal energy means that gradual changes can be made to the applied current in response to changing environmental conditions. For example, if it is detected by the control system 42 that the environmental temperature is falling, and the air water content is above a predetermined threshold, such that the risk of ice accretion is increasing, then the thermal energy applied to the blade may be increased slightly. One option would be for the thermal energy applied to the blade to be caused to track a predetermined parameter, such as an icing risk parameter, or outside air temperature, so that the temperature of the electrical heating devices 32 are caused to have a predetermined temperature differential when compared to the temperature at the blade surface. Maintaining a predetermined temperature differential is an efficient way to manage the power demand of the anti-ice system. A second benefit is associated with the power transfer arrangement 38. The anti-ice system has the potential to impose a high power demand which must be accommodated by the power transfer arrangement 38. The approach discussed here means that the energy running through the power transfer arrangement remains at acceptable levels and so is less likely to cause damage to or increased the wear rate of the power transfer arrangement 38.

Figure 4:
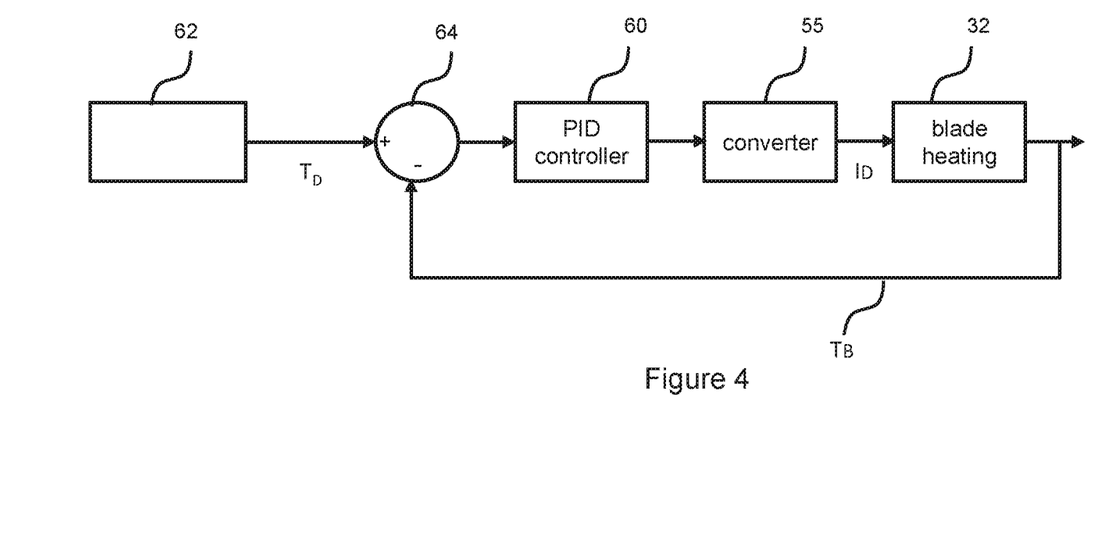
FIG. 4 is a schematic diagram illustrating a control loop implemented by the anti-ice system.

FIG. 4 illustrates an embodiment of a control scheme or 'loop" that may be implemented by the control system 42.

In FIG. 4, a controller or 'control module' 60 is connected to the power converter 55 and, in turn, the power converter 55 is connected to the heating devices 32. For simplicity the heating devices 32 are shown here as a single functional block labelled as 32.

The input to the controller 60 is derived from the output of an icing determination module 62 which performs environmental sensing and modelling in order to output an appropriate target parameter for controlling the power converter 55 in response to the determined environmental conditions.

The icing determination module 62 may be configured to output various target parameters to control the anti-ice system. However, in the illustrated embodiment the icing determination module 62 is configured to process the sensed data and output a target temperature of the heating elements.

The objective of the icing determination module 62 is to output to the controller 60 a temperature value that is a target in response to which the controller 60 controls the energy output of the electrical heating devices 32. This may be achieved by monitoring one or more climatic conditions and determining the minimum thermal energy output required to prevent icing from forming on the blades. For example, although the environmental temperature is one determinant of the icing risk, other relevant factors are power meter data, wind speed, liquid water content, chill factor and blade tip speed.

Taking the various sensed parameters into account, the icing risk determination module 62 can therefore output the target energy output, in the form of a target temperature value, that is required from the electric heating devices 32.

The output of the icing risk determination module 62 is combined with the blade surface temperature feedback measurement $T_B$ at difference junction 64 and the resulting delta value or 'error' is fed into the controller 60. The controller 60 functions in a conventional way to minimise the error valve (delta T) by applying an appropriate control input to the converter which in turns applies the required amount of input current to the heating devices. Since the heating devices 32 are controlled by a power converter 36, the electrical input current can be controlled in a stepless manner which is a more efficient means of control scheme compared to known systems.

In the illustrated embodiment, the controller is a PID controller and so is configured to control the power converter 55, and thus the electric heating devices 32, in such a way to reduce the temperature difference between the device target temperature and the blade surface temperature as quickly as possible whilst avoiding overshoot. As the skilled person will appreciate, a PID (proportional, integral, derivative) controller is a conventional control mechanism that is tunable in order to minimise the error between a desired 'set point', which in the illustrated embodiment is the target temperature of the electric heating devices 32, and a measured process variable, which in this case is the measured temperature of the electric heating devices. Such a control mechanism is typically an efficient way to control an industrial process or system balancing acceptable performance against control complexity. However, it should be noted that other control mechanisms would also be appropriate in context, for example more simple controllers with only PI terms, or even more complex controllers based on Predictive Feedback Control (PFC) and Model Predictive Control methodologies.

Figure 5:
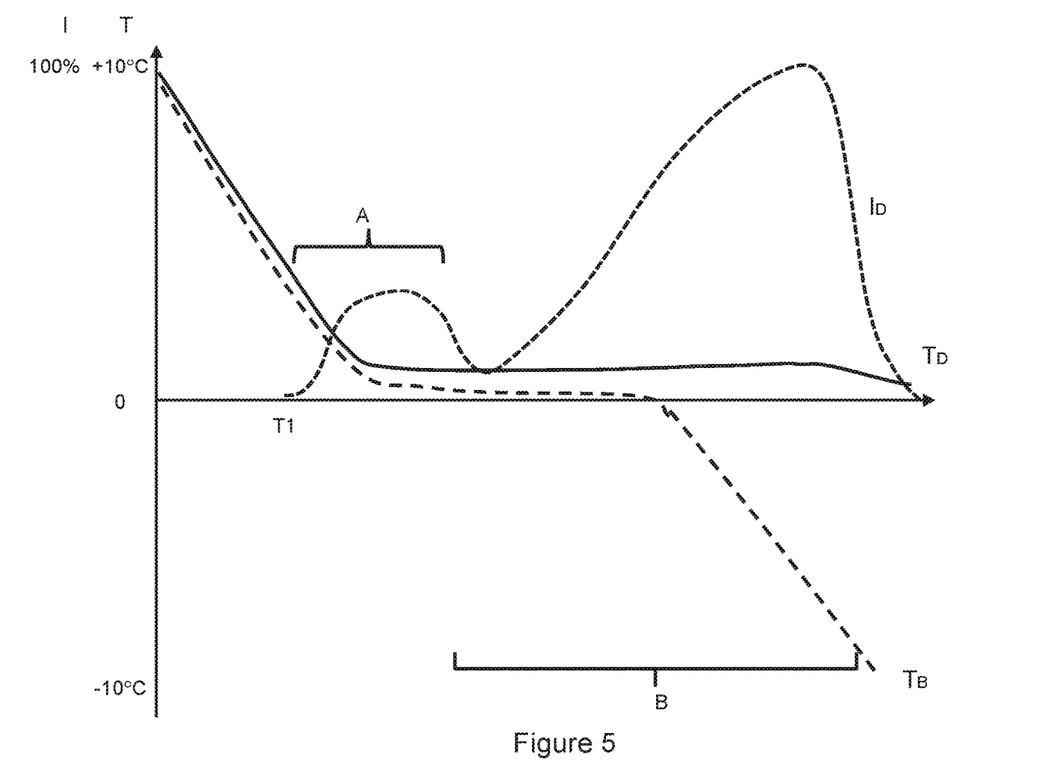
FIG. 5 illustrates a set of curves representing a set of parameters associated with the anti-ice system.

A further explanation is now provided with reference to FIG. 5, which illustrates three curves:

Curve TB represents the blade surface temperature. The blade surface temperature may be measured directly by suitable sensing devices, for example thermocouples embedded into the blade surface. Alternatively, it may be measured by indirect means, for example by known optical techniques of proximity temperature measurement, or by way of techniques where the blade surface temperature may be derived by applying a known relationship to measured parameters such as ambient air temperature, wind speed, and so on.

Curve TD represents the temperature of the electric heating devices 32. This parameter may be measured directly by a thermocouple located within close proximity to the heating device, or it may be derived from a known relationship between current applied and energy output from the heating device.

Curve IC represents the output from the converter in the form of the magnitude of current flow.

FIG. 5 illustrates an example of a falling environmental temperature, represented by the blade surface temperature curve $T_B$, which starts off at the left hand side of the Figure at approximately 10 degrees and reduces gradually to a temperature of approximately 2 degrees where it levels off. The time scale of the temperature variation is not crucial to the understanding of the invention, but typically environmental temperatures do not vary quickly so the temperature drop shown here may take in the order of 15 minutes, but it may be longer, for example in the order of an hour or more.

After a dwell period the temperature $T_B$ once again starts to decrease, transitioning to negative temperatures, and continuing steadily to approximately −10 degrees, in this embodiment.

Returning to the beginning of the X-axis, it will be seen that as the blade surface temperature reduces, so too does the temperature $T_D$ of the electric heating devices. At relatively high temperatures, which here is above about 2 degrees, the electric heating devices are not activated so the device temperature $T_D$ tracks the blade surface temperature TB, albeit at a slightly higher temperature because the heating devices are embedded within, and therefore are insulated by, the blade material and not exposed directly to the environment.

Once the blade surface temperature reaches a temperature at which icing risk becomes significant, the icing risk determination module 62 operates to activate the electric heating devices 32. At this point, therefore, the icing risk determination module 62 will output a target temperature for the electric heating devices 32 to arrest the further reduction in temperature. The start of activation of the electric heating devices 32 is indicated by the region marked as 'A' on FIG. 5

Since the blade surface temperature $T_B$ is reducing, the error between the target temperature and the blade surface temperature is relatively large, and so the controller 60 acts to control the converter 36 to increase the current supply to the electric heating devices. With a focus on region A in FIG. 5, it can be seen that the current increases steeply once the heating devices are turned on, as indicated by T1. This is because the derivative function (D term) of the PID controller responds to the relatively high rate of change of the temperature difference between the blade surface temperature and the target temperature of the heating devices. However, once the blade surface temperature stabilizes, the effective of the D term reduces.

Focusing on region B in FIG. 5, it can be seen that the blade surface temperature TB once again starts to drop, and reduces to negative values. The output of the controller responds to this temperature change by increasing the target temperature difference between the blade surface temperature and the heating devices, which has the effect of increasing the current supplied to the heating devices, as can be seen by the upwards trend of the heating device current ID. As the blade surface temperature continues to reduce, so does the current supplied to the heating devices, as the controller attempts to maintain the temperature of the heating devices at a predetermined level despite the sharp drop in temperature.

To the right-hand side of the curves, it will be appreciated that the blade surface temperature curve TB stops at approximately −10 degrees C. and that this corresponds to a termination of the current supply to the electrical heating devices. It is envisaged that at this temperature the icing risk is acceptably low due to relative humidity dropping to insignificant levels such that icing would not occur. At this point therefore no further blade heating is required and the system can deactivate. To account for slight temperature variations, the system may implement a hysteresis function to prevent repeated activation and deactivation due to slight variances in environmental conditions.

So, from the above explanation, it will be appreciated that the control system comprising the icing risk determination module and the controller is operable to control the converter to apply a smooth variation in applied current to the electrical heating devices in response to changes in environmental conditions.

In the above discussion, reference has been made to specific illustrated embodiments in order that the invention may be understood more fully. Some variations on those embodiments have been mentioned above. However, the skilled person would understand that other variations could be made to the illustrated embodiments without departing from the scope of the invention, as defined by the claims.

The invention claimed is:

1. A wind turbine, comprising:
a plurality of wind turbine blades;
a blade anti-ice system including a blade heating arrangement;
a control system; and
a power supply configured to provide power to the blade heating arrangement, wherein the power supply comprises a power converter, and
wherein the control system controls a power output of the power converter so as to apply a stepless power input to the blade heating arrangement, and wherein the control system controls the power output of the power converter based on a determined difference between a measured temperature of a wind turbine blade surface and a measured temperature of the blade heating arrangement.

2. The wind turbine of claim 1, wherein the blade heating arrangement includes a plurality of electric heating devices.

3. The wind turbine of claim 2, wherein the power converter is configured to supply power to the plurality of electric heating devices.

4. The wind turbine of claim 3, wherein the power converter is one of a plurality of power converters, each power converter of the plurality of power converters is configured to supply power to a group of one or more electric heating devices of the plurality of electric heating devices.

5. The wind turbine of claim 4, wherein each power converter of the plurality of power converters is associated with a respective blade of the wind turbine.

6. The wind turbine of claim 2, wherein the blade anti-ice system further comprises a switch device to selectively switch the power supply from the power converter to selected ones of the plurality of electric heating devices.

7. The wind turbine of claim 1, wherein the control system controls the power output of the power converter so that the stepless power input to the blade heating arrangement is ramped up gradually as icing conditions become more severe.

8. The wind turbine of claim 1, wherein the control system controls the power output of the power converter so that the stepless power input to the blade heating arrangement tracks a predetermined parameter so that the determined difference between the measured temperature of the wind turbine blade surface of the wind turbine blade and the measured temperature of the blade heating arrangement is maintained as environmental conditions change.

9. A method of controlling a wind turbine blade anti-ice system, the wind turbine blade anti-ice system including a blade heating arrangement, a control system and a power supply, wherein the power supply includes a power converter and wherein the method comprises:

controlling a power output of the power converter so as to apply a stepless power input to the blade heating arrangement, and wherein controlling the power output of the power converter is based on a determined difference between a measured temperature of a wind turbine blade surface and a measured temperature of the blade heating arrangement.

10. The method of claim 9, wherein controlling the power output of the power converter includes monitoring one or more climatic conditions, determining a minimum thermal energy output required to prevent ice from forming on a blade, and applying power to the blade heating arrangement to track the determined minimum thermal energy output.

11. The method of claim 9, wherein the blade heating arrangement includes a plurality of electric heating devices.

12. The method of claim 11, wherein the power converter is configured to supply power to the plurality of electric heating devices.

13. The method of claim 12, wherein the power converter is one of a plurality of power converters, each power converter of the plurality of power converters is configured to supply power to a group of one or more electric heating devices of the plurality of electric heating devices.

14. The method of claim 9, wherein the power output of the power converter is controlled so that the stepless power input to the blade heating arrangement is ramped up gradually as icing conditions become more severe.

15. The method of claim 9, wherein the power output of the power converter is controlled so that the stepless power input to the blade heating arrangement tracks a predetermined parameter so that the determined difference between the measured temperature of the wind turbine blade surface of the wind turbine blade and the measured temperature of the blade heating arrangement is maintained as environmental conditions change.

16. A wind turbine, comprising:
a wind turbine blade;
a blade anti-ice system including a resistive heater provided along the wind turbine blade;
a control system; and
a power supply configured to provide power to the resistive heater, the power supply comprises a power converter, and
wherein the control system controls a power output of the power converter so as to apply a stepless power input to the resistive heater, and wherein the control system controls the power output of the power converter based on a determined difference between a measured temperature of a wind turbine blade surface of the wind turbine blade and a measured temperature of the resistive heater.

17. The wind turbine of claim 16, wherein the control system controls the power output of the power converter so that the stepless power input to the resistive heater is ramped up gradually as icing conditions become more severe.

18. The wind turbine of claim 16, wherein the control system controls the power output of the power converter so that the stepless power input to the resistive heater tracks a predetermined parameter so that the determined difference between the measured temperature of the wind turbine blade surface of the wind turbine blade and the measured temperature of the resistive heater is maintained as environmental conditions change.

19. The wind turbine of claim 18, wherein the predetermined parameter is an icing risk parameter.

20. The wind turbine of claim 18, wherein the predetermined parameter is an outside air temperature.

* * * * *